(12) United States Patent
Lin et al.

(10) Patent No.: US 9,733,806 B2
(45) Date of Patent: Aug. 15, 2017

(54) ELECTRONIC DEVICE AND USER INTERFACE OPERATING METHOD THEREOF

(71) Applicant: HTC Corporation, Taoyuan, Taoyuan County (TW)

(72) Inventors: Yen-Hung Lin, Taoyuan (TW); Lan-Lan Ma, Taoyuan (TW); Yu-Yen Wen, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 463 days.

(21) Appl. No.: 14/049,259

(22) Filed: Oct. 9, 2013

(65) Prior Publication Data

US 2015/0100918 A1    Apr. 9, 2015

(51) Int. Cl.
*G06F 3/0484* (2013.01)
*G06F 3/0488* (2013.01)

(52) U.S. Cl.
CPC .......... *G06F 3/0484* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 9,277,362 B2* | 3/2016 | Li | G01S 19/14 |
| 2008/0225014 A1* | 9/2008 | Kim | G06F 3/04886 |
| | | | 345/173 |
| 2009/0153495 A1* | 6/2009 | Chen | G06F 3/04847 |
| | | | 345/173 |
| 2010/0100842 A1* | 4/2010 | Kim | G06F 3/04886 |
| | | | 715/808 |
| 2011/0175930 A1 | 7/2011 | Hwang et al. | |
| 2013/0050119 A1* | 2/2013 | Nemoto | G06F 3/0488 |
| | | | 345/173 |
| 2013/0074000 A1* | 3/2013 | Liu | G06F 3/04883 |
| | | | 715/781 |
| 2013/0076684 A1* | 3/2013 | Otowa | G06F 3/04883 |
| | | | 345/173 |
| 2013/0082965 A1* | 4/2013 | Wada | G06F 3/04883 |
| | | | 345/173 |
| 2013/0154978 A1* | 6/2013 | Kim | G06F 3/0483 |
| | | | 345/173 |
| 2014/0189583 A1* | 7/2014 | Yang | G06F 1/3234 |
| | | | 715/800 |

FOREIGN PATENT DOCUMENTS

| | | |
|---|---|---|
| CN | 102129345 A | 7/2011 |
| CN | 102520860 A | 6/2012 |

OTHER PUBLICATIONS

Office Action issued in corresponding Taiwan application on Jun. 15, 2015.
Office Action issued in corresponding China patent application on Mar. 17, 2017.

* cited by examiner

*Primary Examiner* — Phenuel Salomon
(74) *Attorney, Agent, or Firm* — McClure, Qualey & Rodack, LLP

(57) ABSTRACT

An electronic device and a user interface operating method thereof. The electronic device comprises an input unit and a processing unit. The input unit detects an input from a user. The processing unit adjusts a home screen from a first display location to a second display location according to the input.

18 Claims, 19 Drawing Sheets

ELECTRONIC DEVICE AND USER INTERFACE OPERATING METHOD THEREOF

FIELD OF THE INVENTION

The present invention relates to an electronic device and a user interface operating method thereof; and more particularly, the present invention relates to an electronic device with an adjustable home screen and a user interface operating method thereof.

DESCRIPTION OF THE RELATED ART

For ease of user's operation, most of the common electronic devices are equipped with operating systems which are usually presented in the form of graphical user interfaces. The graphical user interfaces of the operating systems usually comprise a home screen at the lowest layer, an example of which is the desktop interface of the Windows operating system. The home screen is mainly configured to display information in a fixed operating area, and is used to limit the display range for the user's operation. However, when the home screen is fixed, the overall operation becomes less flexible for the user.

For example, as the intelligent electronic devices become widely used, it is more often for users to view multimedia contents such as web pages, movies, and documents on their intelligent electronic devices. In order to provide users with better view angles, large-sized screens have become the trend of current development. However, although the large-sized screens is favorable for reading, it also results in oversized devices, which causes great inconvenience for operating with a single hand.

Specifically, when a user intends to operate an intelligent electronic device by holding it with a single hand, the user usually can only use his/her thumb to contact the touch screen of the intelligent electronic device to perform corresponding inputs for the ergonomic reasons. Therefore, if the screen of an intelligent electronic device is oversized or the thumb of the user is not long enough, it will be difficult for the user to operate the intelligent electronic device with a single hand. This will remarkably reduces the experience of smooth operations in use of the intelligent electronic device.

Accordingly, an urgent need exists in the art to improve the user interface so that users can accomplish corresponding operations more smoothly to increase the convenience in use of the electronic devices.

CONTENTS OF THE INVENTION

To solve the aforesaid problems, the present invention provides a user interface operating method for an electronic device. The electronic device comprises an input unit and a processing unit. The user interface operating method comprises: (a) enabling the input unit of the electronic device to detect a first input from a user; and (b) enabling the processing unit of the electronic device to adjust a home screen from a first display location to a second display location according to the first input.

To achieve the aforesaid objectives, the present invention further provides an electronic device, which comprises an input unit and a processing unit. The input unit is configured to detect a first input from a user, and the processing unit is configured to adjust a home screen from a first display location to a second display location according to the first input.

The present invention further provides an operating method for an electronic device. The electronic device comprises an input unit and a processing unit. The operating method comprises: (a) enabling the input unit of the electronic device to detect a first input from a user; (b) enabling the processing unit of the electronic device to have the electronic device enter a home screen control mode according to the first input; and (c) enabling the processing unit of the electronic device to automatically adjust a home screen from an initial display location to a control display location in the home screen control mode.

To achieve the aforesaid objectives, the present invention further provides an electronic device, which comprises an input unit and a processing unit. The input unit is configured to detect a first input from a user. The processing unit is configured to have the electronic device enter a home screen control mode according to the first input, and to automatically adjust a home screen from an initial display location to a control display location in the home screen control mode.

The detailed technology and preferred embodiments implemented for the subject invention are described in the following paragraphs accompanying the appended drawings for people skilled in this field to well appreciate the features of the claimed invention.

DESCRIPTION OF EMBODIMENTS

In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
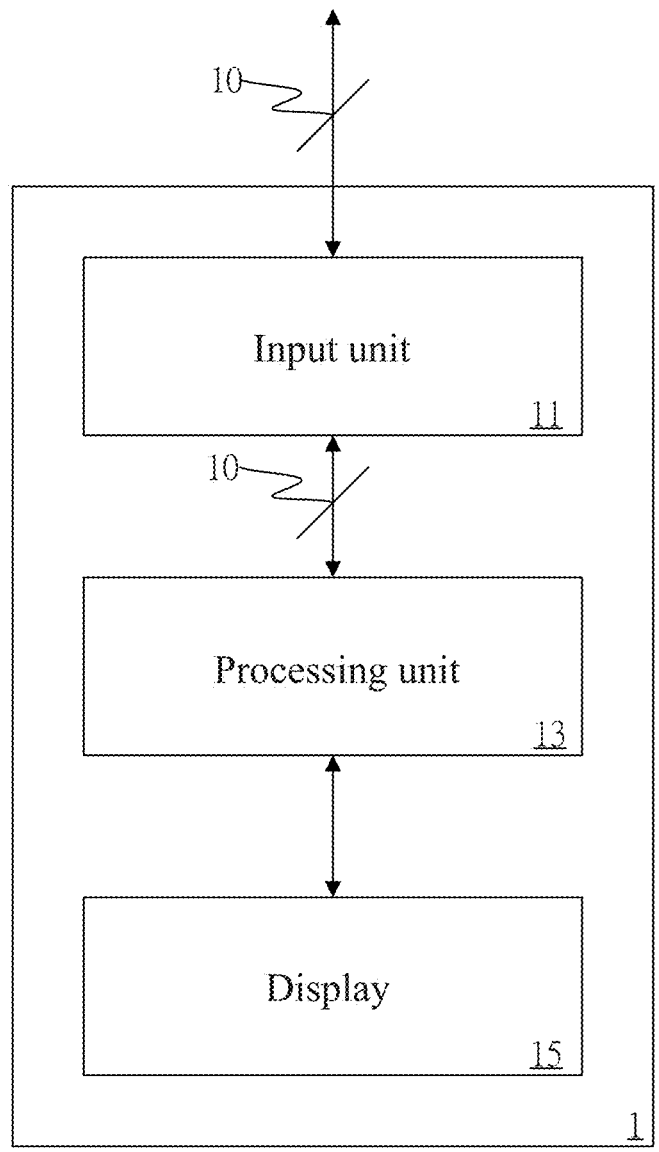
FIG. 1A is a schematic view of an electronic device according to a first embodiment of the present invention.
Figure 1B:
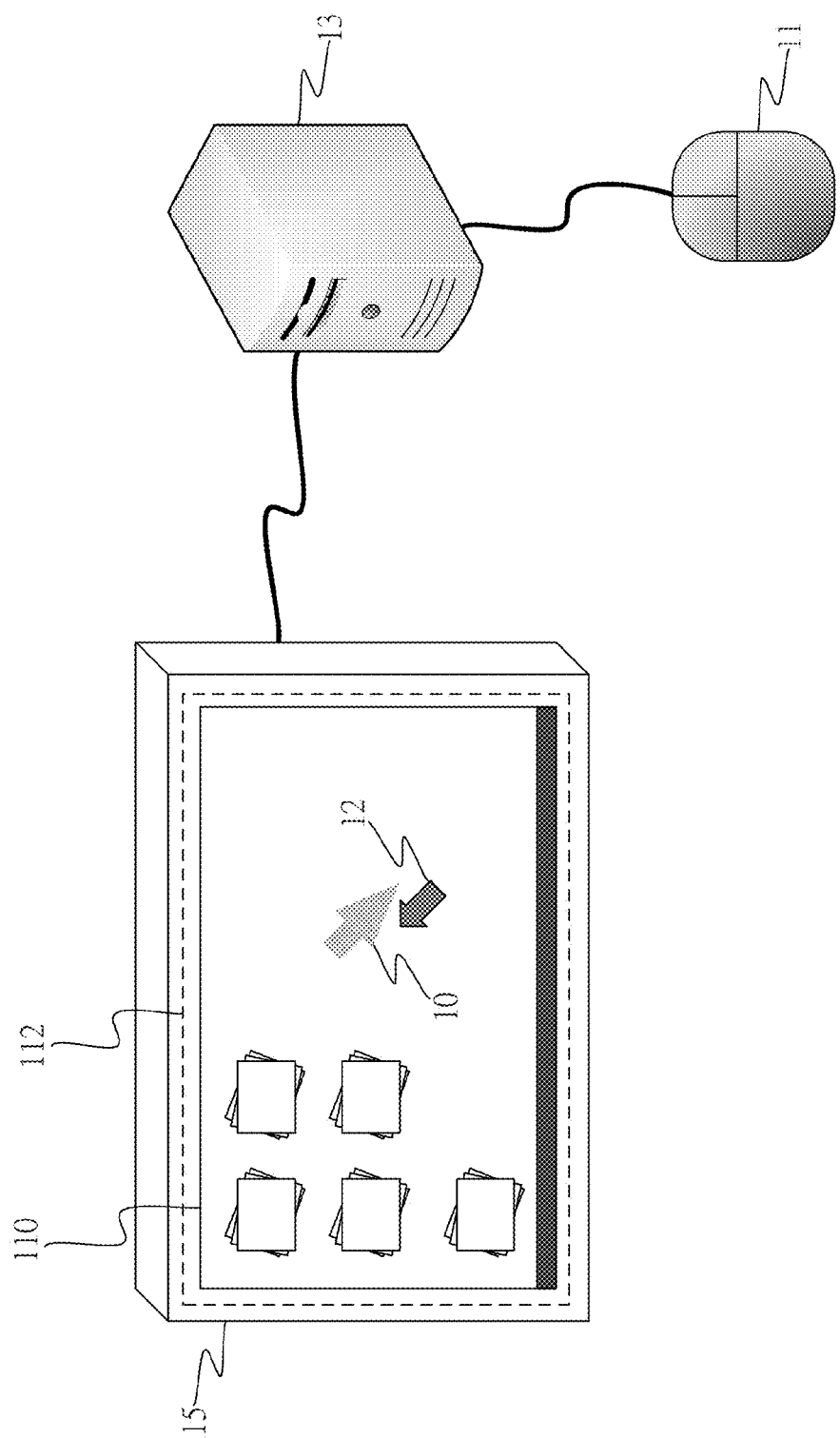
FIG. 1B to FIG. 1C are schematic views illustrating how the electronic device according to the first embodiment of the present invention operates.
Figure 1C:
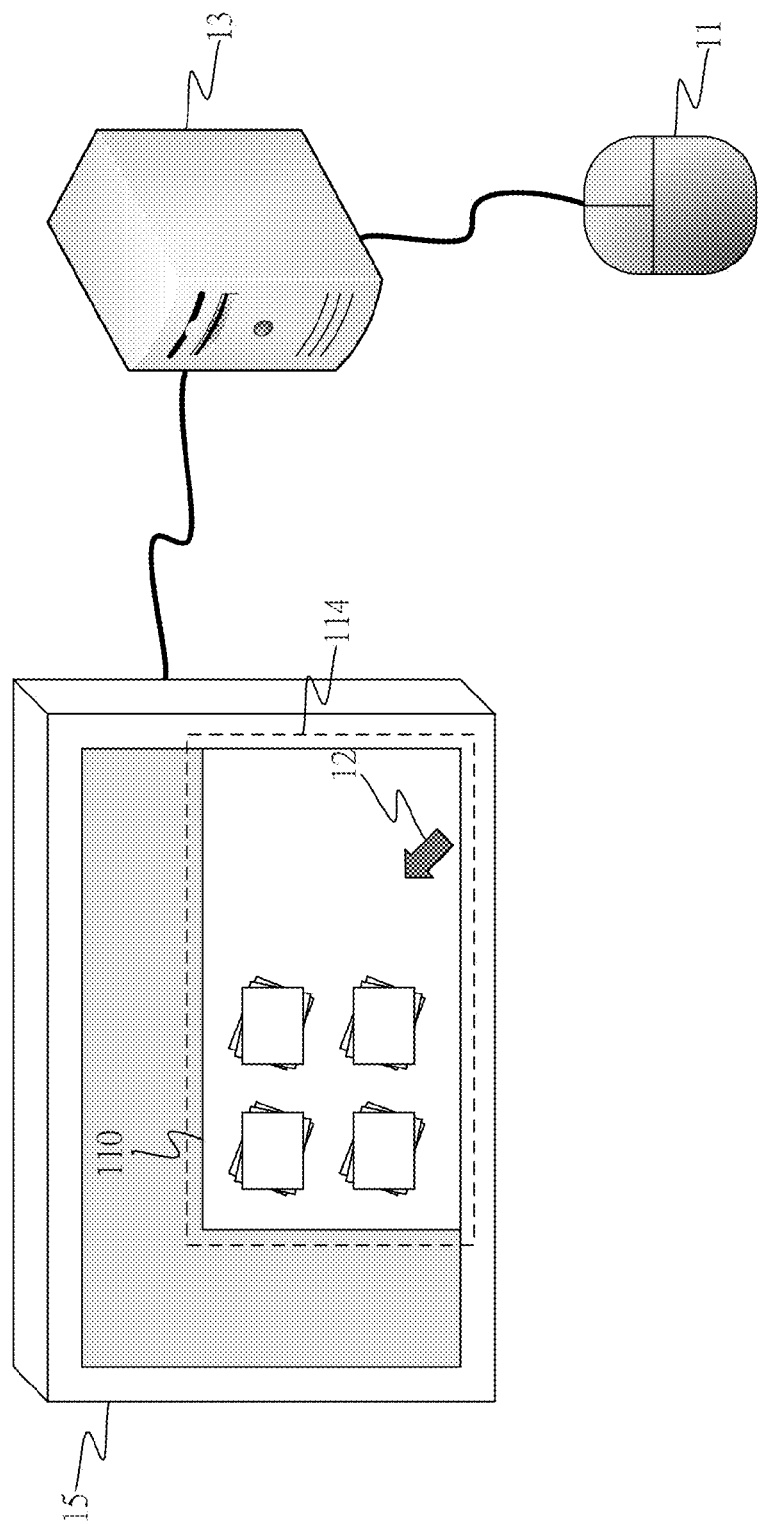

Please refer to FIG. 1A to FIG. 1C. FIG. 1A is a schematic view of an electronic device 1 according to a first embodiment of the present invention, and FIG. 1B to FIG. 1C are schematic views illustrating how the electronic device 1 according to the first embodiment of the present invention operates. The electronic device 1 comprises an input unit 11, a processing unit 13, and a display 15. Hereinbelow, interactions between these elements will be further described.

Firstly, as shown in FIG. 1B, the electronic device 1 displays a home screen 110 on the display 15. The home screen 110 is a user interface which is at the lowest layer in the operating environment and comprises a row of system states. Next, the user can firstly perform a first input 10 (which may be a directional input as shown) to the home screen 110 by means of the input unit 11 and a cursor 12 displayed on the display 15; and then the first input 10 is detected by the input unit 11 of the electronic device 1 and transmitted to the processing unit 13.

Referring to FIG. 1C together, the processing unit 13 can then adjust the whole home screen 110 displayed on the display 15 from a first display location 112 to a second display location 114 according to the first input 10. Thus, the home screen 110 can be displayed by the display 15 based on the second display location 114. In this way, by moving the whole home screen 110, the user can adjust the graphical user interface into a configuration suited to his/her subsequent operations so that the user can accomplish the corresponding operations more smoothly.

Figure 2A:
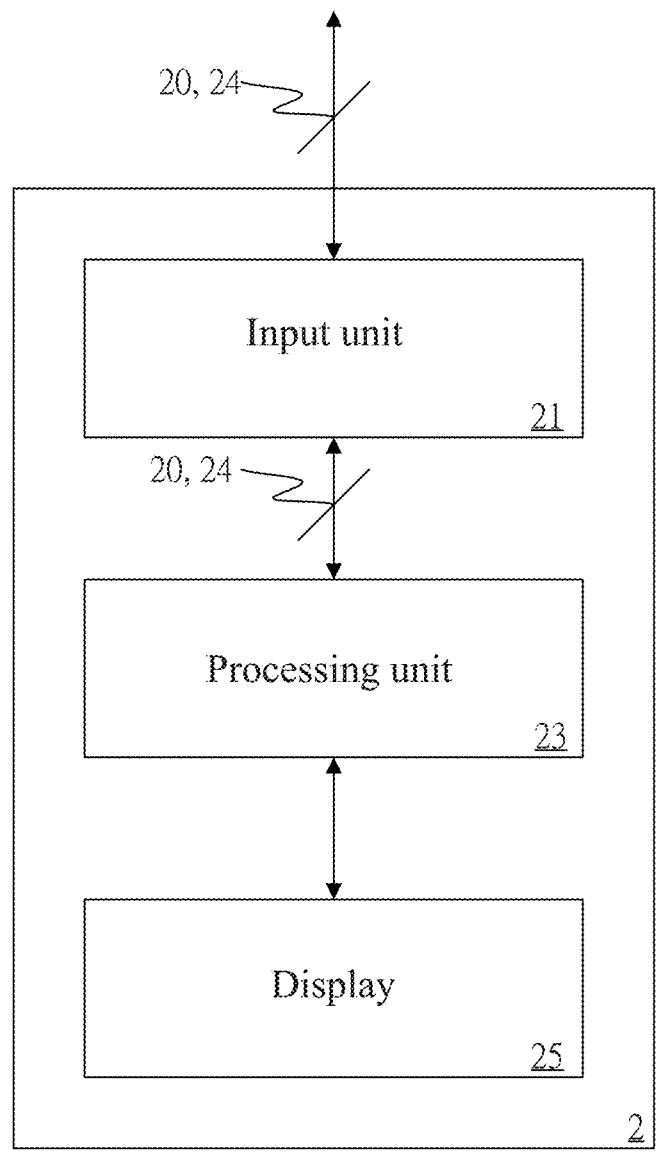
FIG. 2A is a schematic view of an electronic device according to a second embodiment of the present invention.
Figure 2B:
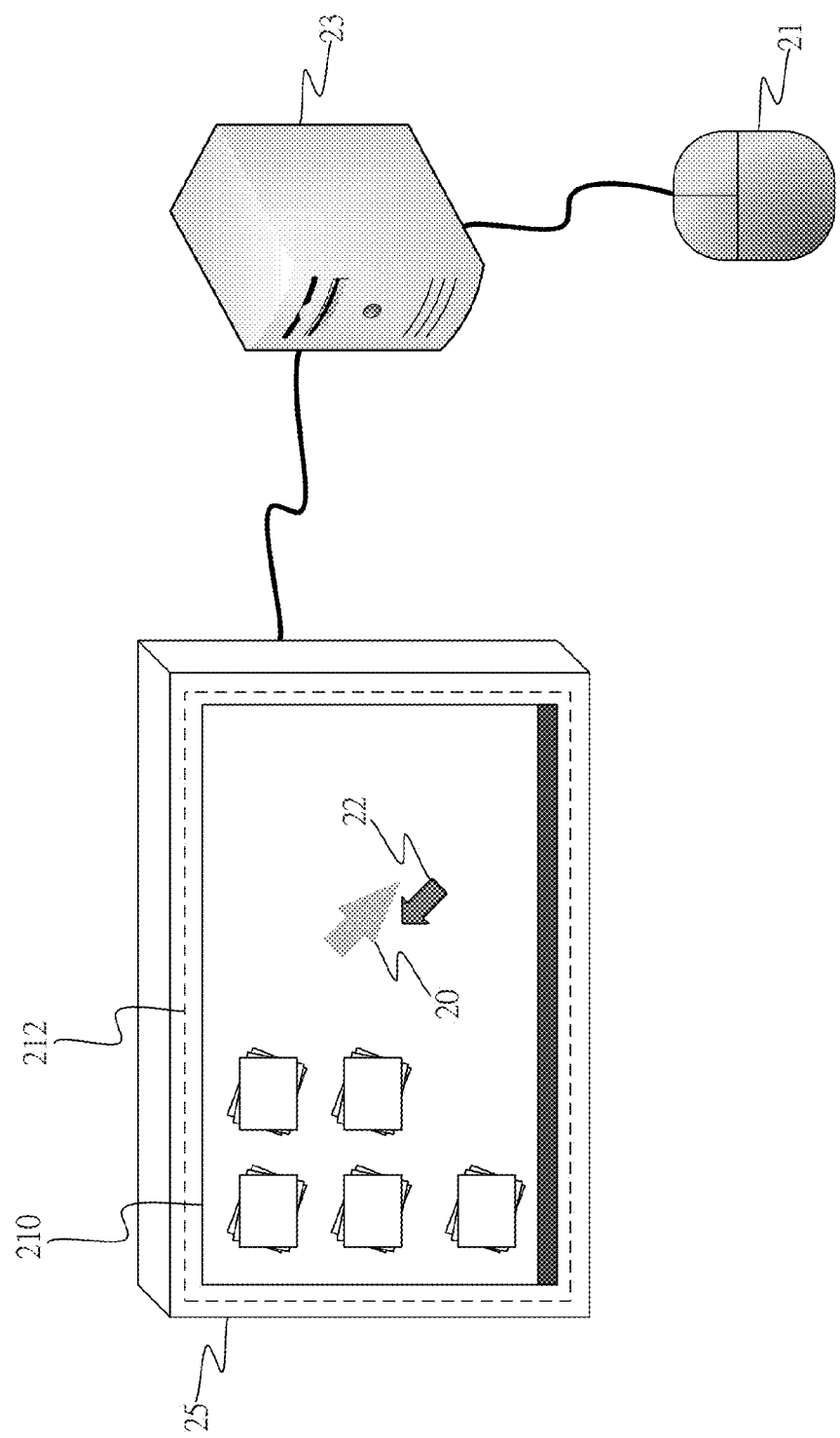
FIG. 2B to FIG. 2C are schematic views illustrating how the electronic device according to the second embodiment of the present invention operates.
Figure 2C:
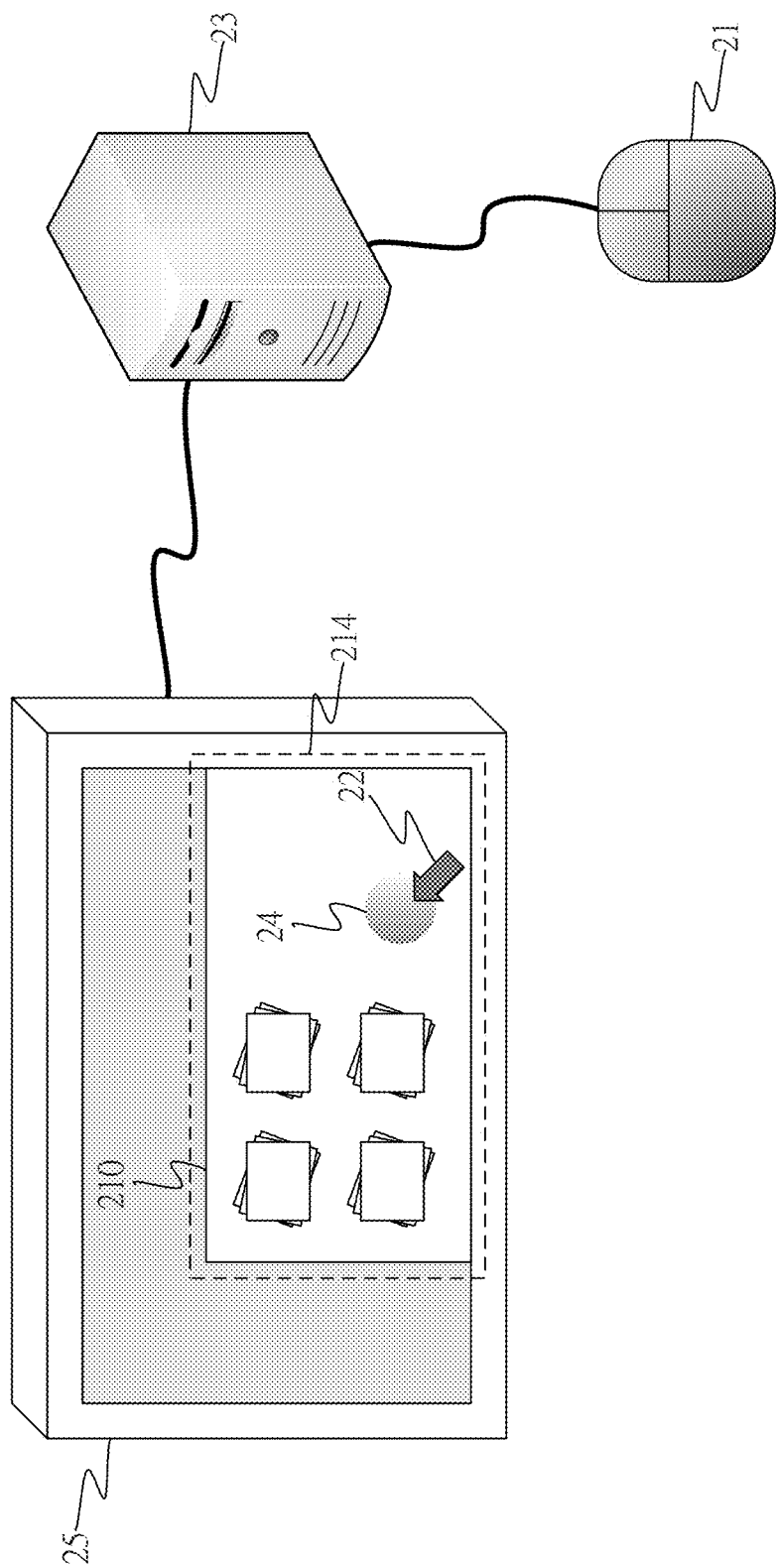

Please refer to FIG. 2A to FIG. 2C. FIG. 2A is a schematic view of an electronic device 2 according to a second embodiment of the present invention, and FIG. 2B to FIG. 2C are schematic views illustrating how the electronic device 2 according to the second embodiment of the present invention operates. Similarly, the electronic device 2 comprises an input unit 21, a processing unit 23, and a display 25. More operation details will be disclosed in the second embodiment; and similarly, interactions between these elements will be further described hereinbelow.

Firstly, as shown in FIG. 2B, the electronic device 2 displays a home screen 210 on the display 25. Similarly, the home screen 210 is a user interface which is at the lowest layer in the operating environment and comprises a row of system states. Then, the processing unit 23 determines that the electronic device 2 enters a home screen control mode and, in response to this, the user can perform a first input 20 (which may be a directional input as shown) to the home screen 210 by means of the input unit 21 and a cursor 22 displayed on the display 25. Thereafter, the first input 20 is detected by the input unit 21 of the electronic device 2 and transmitted to the processing unit 23.

Please refer to FIG. 2C together. Similarly, the processing unit 23 adjusts the whole home screen 210 displayed on the display 25 from a first display location 212 to a second display location 214 according to the first input 20. Thus, the home screen 210 can be displayed on the display 25 based on the second display location 214. After the home screen 210 has been adjusted to the second display location 214, the user can input a second input 24 via the input unit 21 depending on his/her desired operations.

In other words, the input unit 21 can receive a second input 24 from the user after the home screen 210 has been adjusted to the second display location 214. In this way, the processing unit 23 can execute a function in response to the second input 24. For example, the second input 24 is mainly used to execute corresponding graphical user interface functions such as executing, copying, or pop-up menu operations.

Figure 3A:
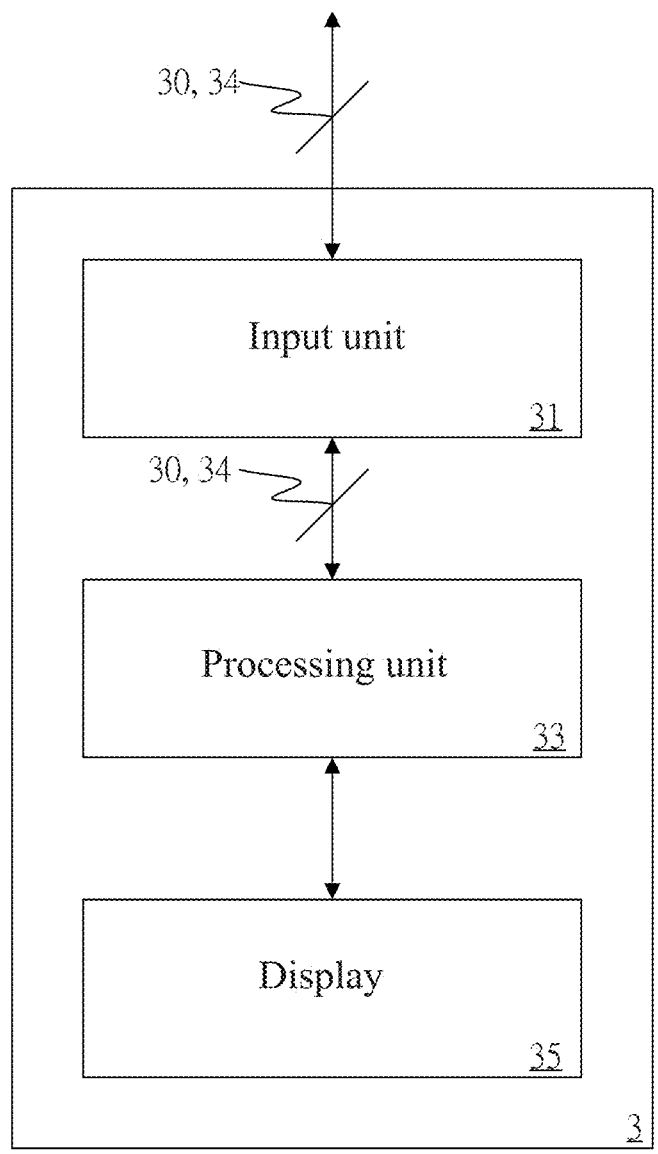
FIG. 3A is a schematic view of an electronic device according to a third embodiment of the present invention.
Figure 3B:
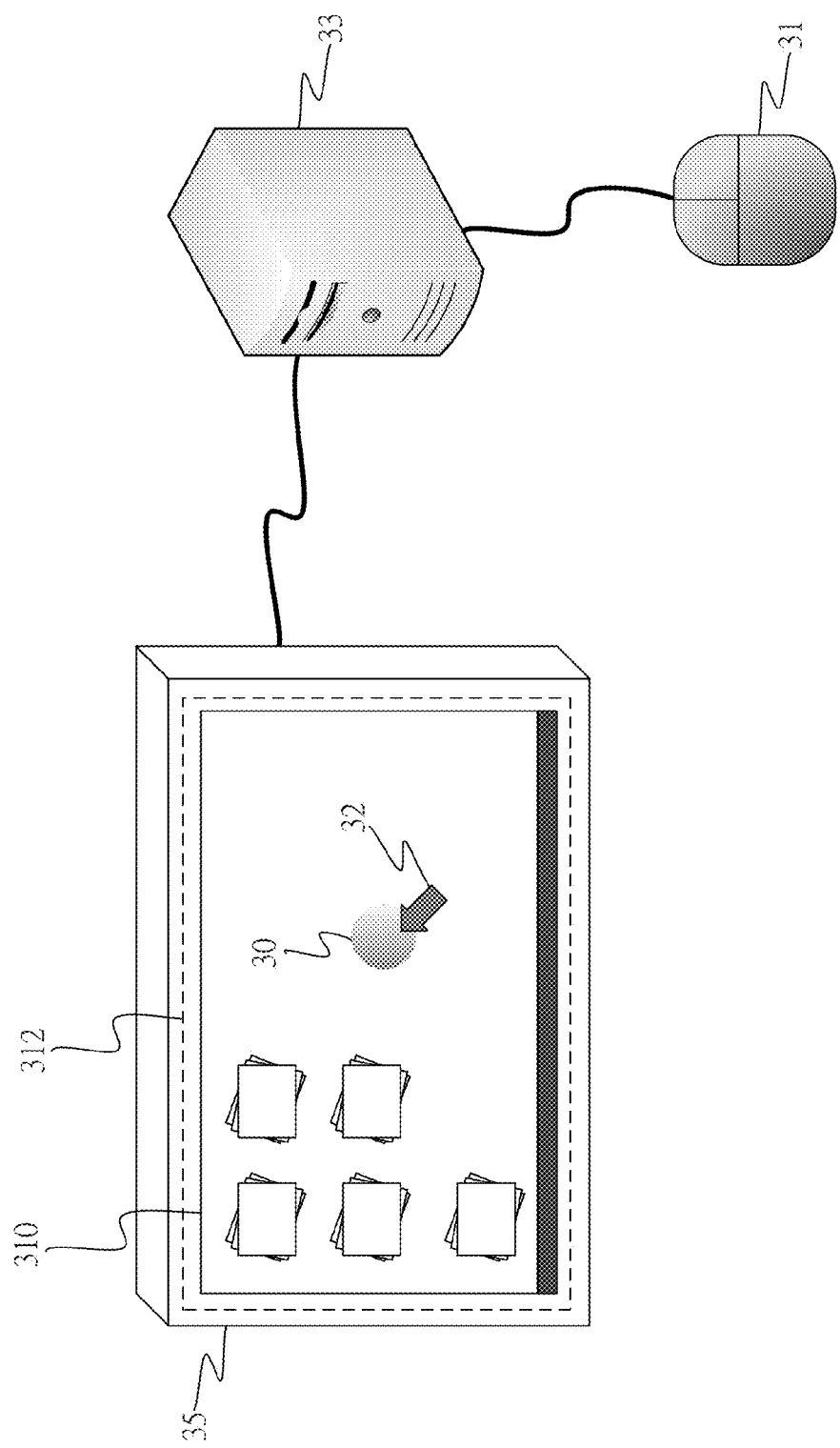
FIG. 3B to FIG. 3C are schematic views illustrating how the electronic device according to the third embodiment of the present invention operates.
Figure 3C:
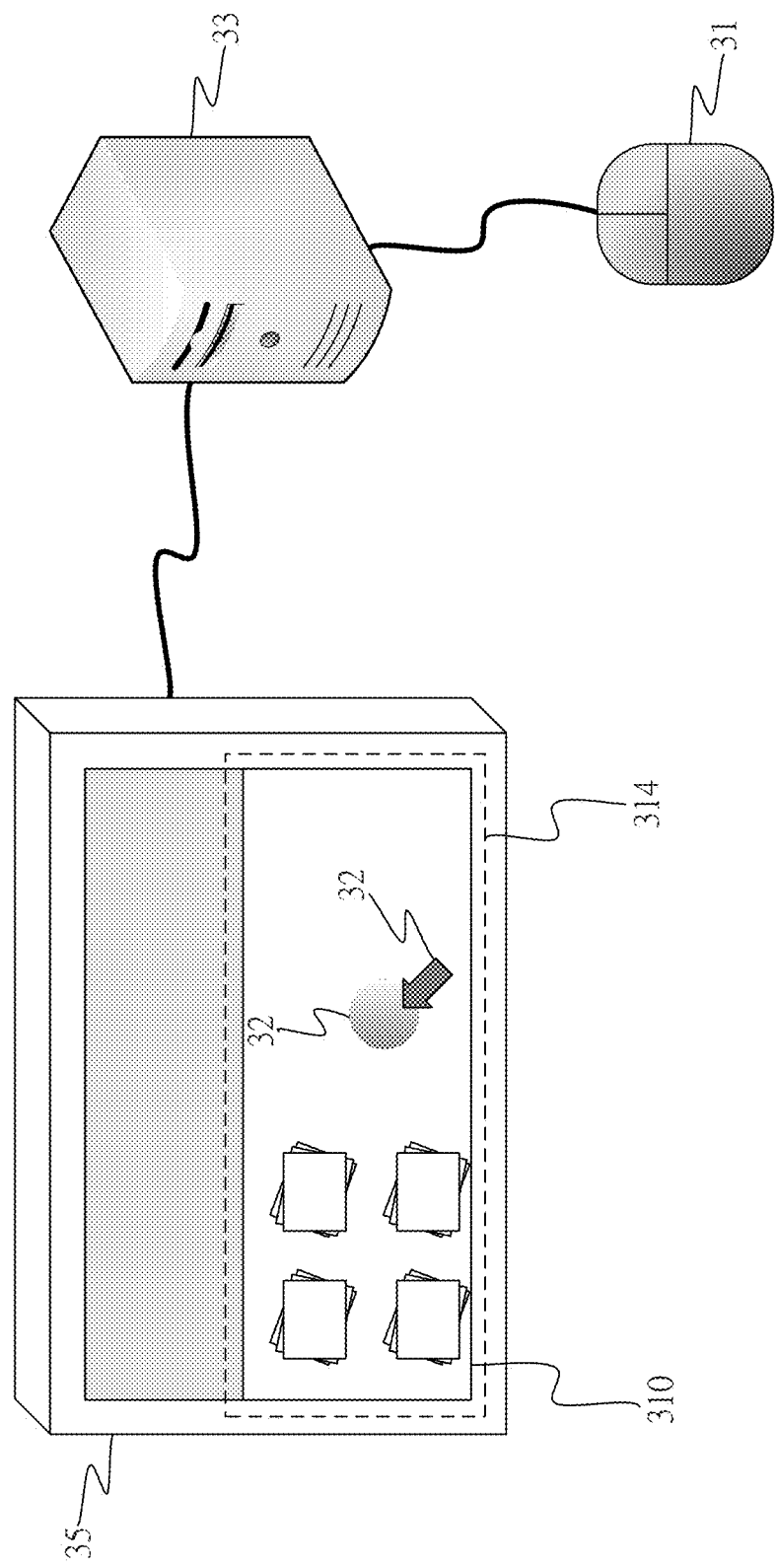

Please refer to FIG. 3A to FIG. 3C. FIG. 3A is a schematic view of an electronic device 3 according to a third embodiment of the present invention, and FIG. 3B to FIG. 3C are schematic views illustrating how the electronic device 3 according to the third embodiment of the present invention operates. Similarly, the electronic device 3 comprises an input unit 31, a processing unit 33, and a display 35. Hereinbelow, interactions between these elements will be further described.

Firstly, as shown in FIG. 3B, the electronic device 3 displays a home screen 310 on the display 35. Similarly, the home screen 310 is a user interface which is at the lowest layer in the operating environment and comprises a row of system states. Next, the user can firstly perform a first input 30 (e.g. a specific key or an execution instruction) to the home screen 310 by means of the input unit 31 and a cursor 32 displayed on the display 35; and then the first input 30 is detected by the input unit 31 of the electronic device 3 and transmitted to the processing unit 33.

Referring to FIG. 3C together, the processing unit 33 may then have the electronic device 3 enter a home screen control mode (not shown) according to the first input 30, and automatically adjust the home screen 310 from an initial display location 312 to a control display location 314 in the home screen control mode. Thus, the electronic device 3 which has entered the home screen control mode can automatically adjust the home screen 310 to the control display location 314 suited to the user's operation.

After the home screen 310 has been adjusted to the control display location 314, the user can input a second input 34 via the input unit 31 depending on his/her desired operations. In other words, the input unit 31 can receive a second input 34 from the user after the home screen 310 has been automatically adjusted to the control display location 314. In this way, the processing unit 33 can execute a function in response to the second input 34.

Figure 4A:
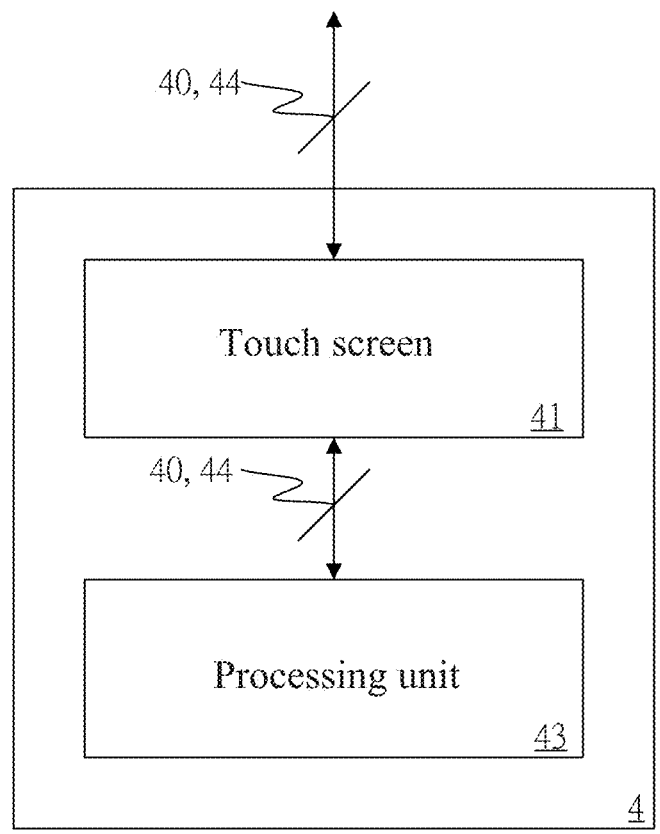
FIG. 4A is a schematic view of an electronic device according to a fourth embodiment of the present invention.
Figure 4B:
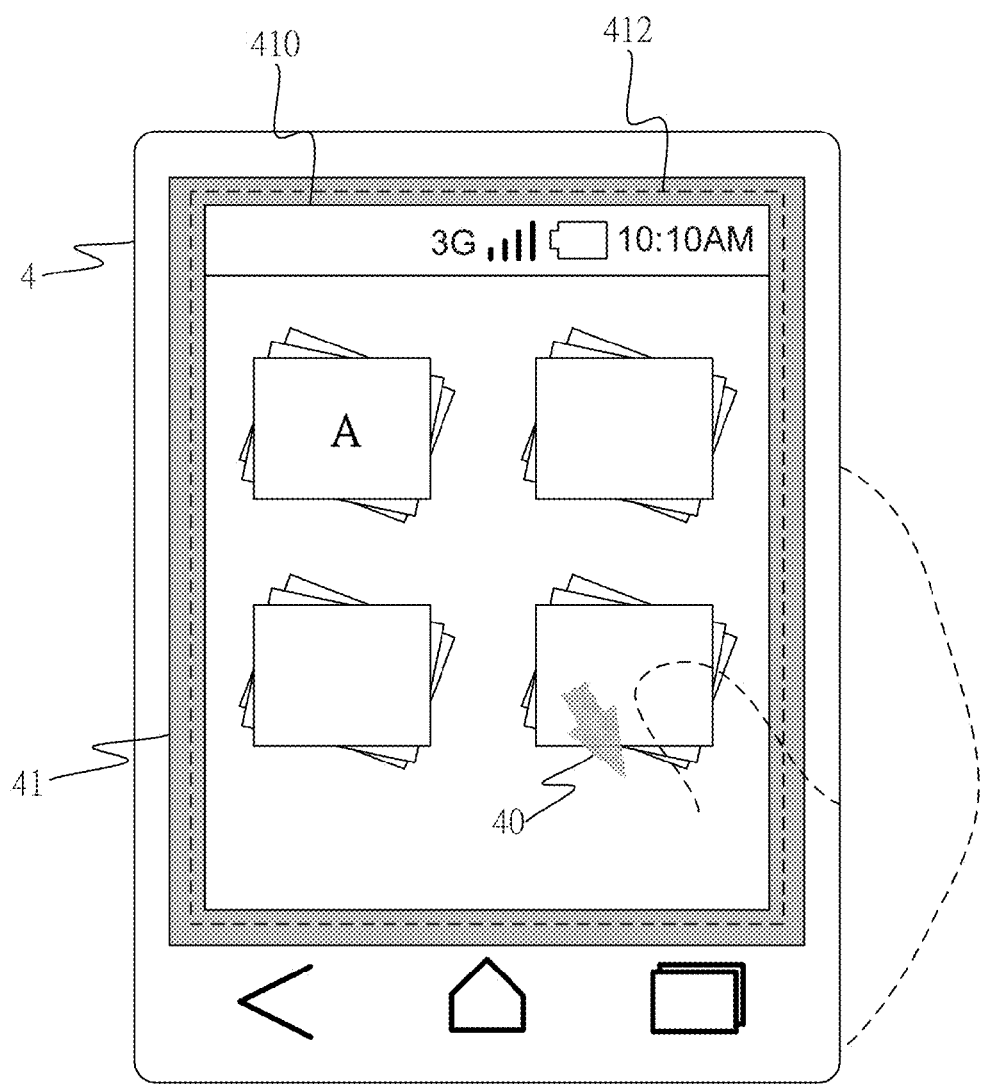
FIG. 4B to FIG. 4C are schematic views illustrating how the electronic device according to the fourth embodiment of the present invention operates.
Figure 4C:
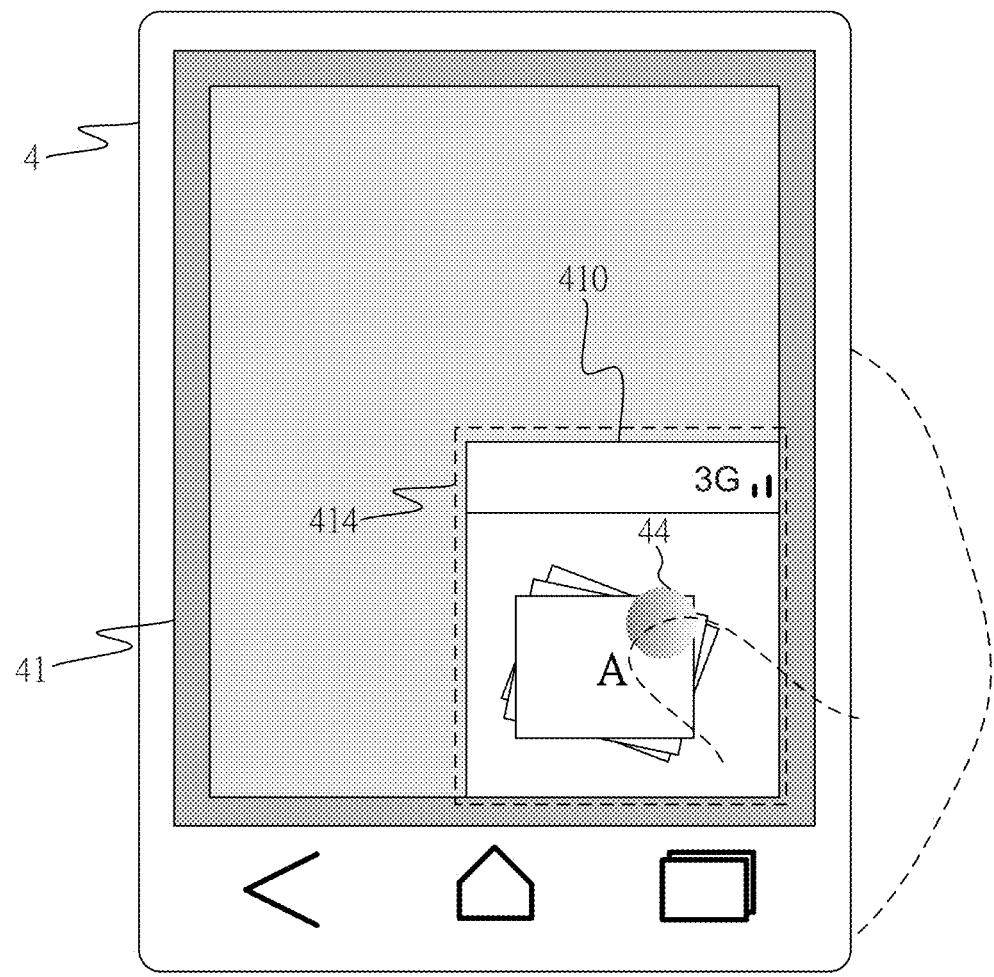

Please refer to FIG. 4A to FIG. 4C. FIG. 4A is a schematic view of an electronic device 4 according to a fourth embodiment of the present invention, and FIG. 4B to FIG. 4C are schematic views illustrating how the electronic device 4 according to the fourth embodiment of the present invention operates. The electronic device 4 comprises an input unit and a processing unit 43. The input unit of the fourth embodiment is a touch screen 41; and similarly, interactions between these elements will be further described hereinbelow.

Firstly, as shown in FIG. 4B, the electronic device 4 displays a home screen 410 on the touch screen 41. Similarly, the home screen 410 is a user interface which is at the lowest layer in the operating environment and comprises a row of system states. Next, when the user is holding the electronic device 4 with a single hand and intends to perform a corresponding operation on an icon A in the home screen 410 with his/her thumb (as shown by the dashed line), the user may firstly adjust the location of the whole home screen 410 because the user can not touch the icon A with his/her thumb directly.

Specifically, the processing unit 43 firstly determines that the electronic device 4 enters a home screen control mode. Then, the user can perform a first input 40 (which may be a directional touch input as shown) to the home screen 410. Thereafter, the first input 40 from the user is detected by the touch screen 41 and then transmitted to the processing unit 43. Referring to FIG. 4C together, the processing unit 43 adjusts the whole home screen 410 displayed on the touch screen 41 from a first display location 412 to a second display location 414 according to the first input 40.

Thus, the home screen 410 can be displayed on the touch screen 41 based on the second display location 414. Hence, by moving the whole home screen 410, the user can move the icon A to the second display location 414 that can be operated by the thumb. Then, the user can perform a corresponding operation on the icon A to accomplish a task while the electronic device 4 is being held with a single hand.

Further speaking, a second touch input 44 from the user may be detected after the home screen 410 has been moved to the operating location 414, and the processing unit 43 can execute a corresponding function according to the second touch input 44. For example, when the home screen 410 is moved to the second display location 414 (i.e. the icon A is moved to the second display location 414 that can be operated by the thumb), the user can perform a second touch input 44 on the icon A so that functions corresponding to the icon A such as opening, copying, or pop-up menu operations can be executed.

Figure 5A:
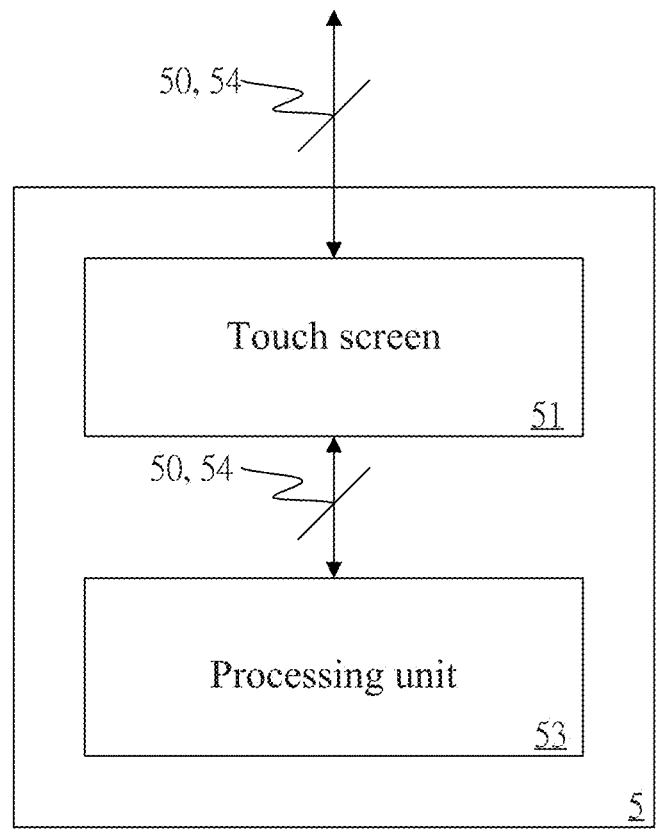
FIG. 5A is a schematic view of an electronic device according to a fifth embodiment of the present invention.
Figure 5B:
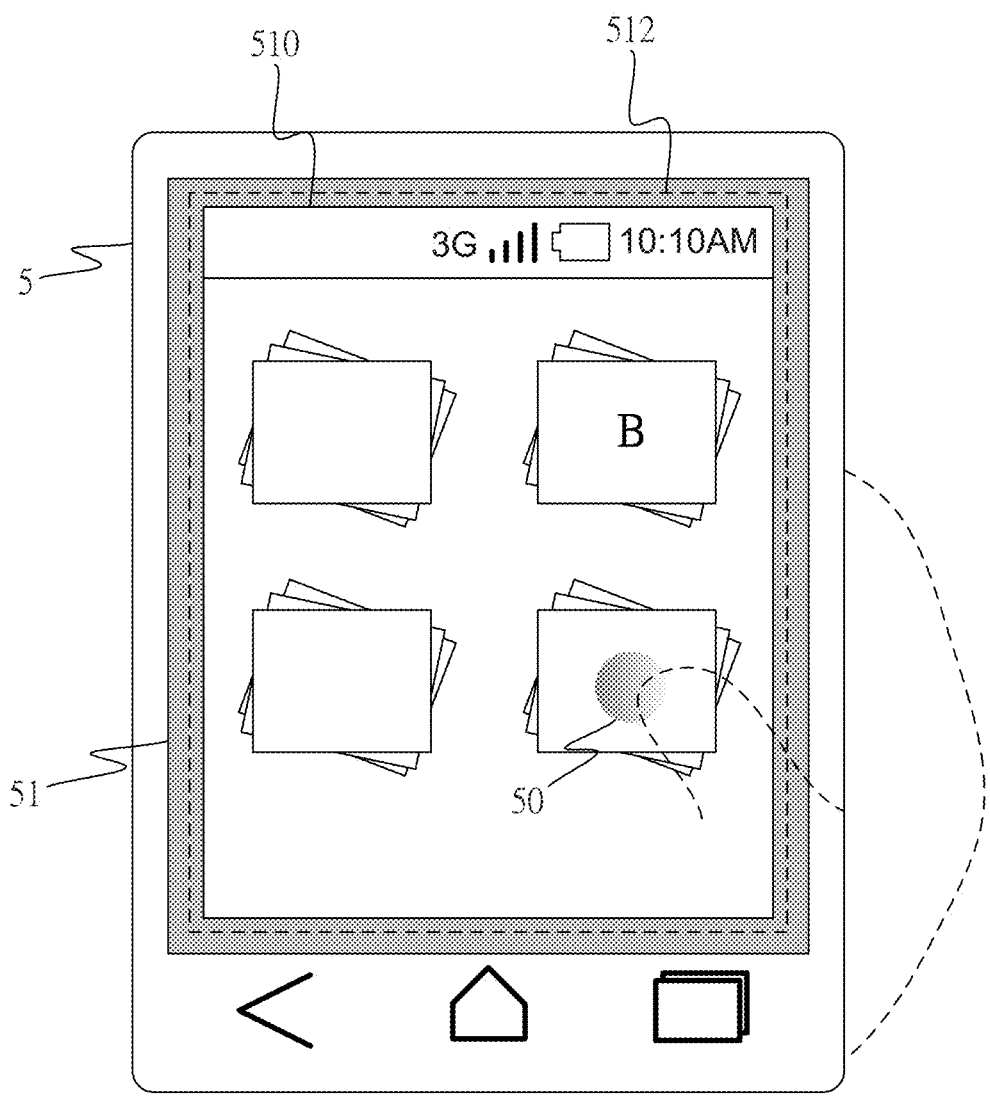
FIG. 5B to FIG. 5C are schematic views illustrating how the electronic device according to the fifth embodiment of the present invention operates.
Figure 5C:
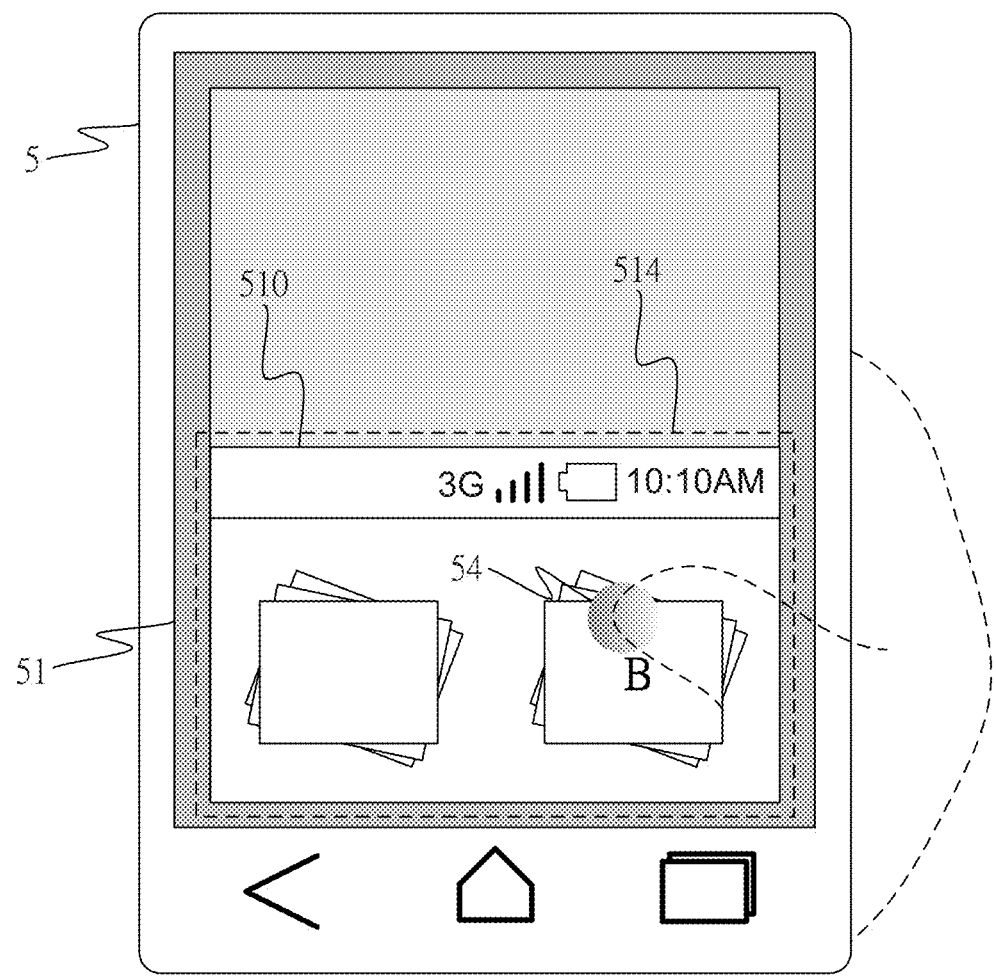

Please refer to FIG. 5A to FIG. 5C. FIG. 5A is a schematic view of an electronic device 5 according to a fifth embodiment of the present invention, and FIG. 5B to FIG. 5C are schematic views illustrating how the electronic device 5 according to the fifth embodiment of the present invention operates. The electronic device 5 comprises an input unit and a processing unit 53. The input unit of the fifth embodiment is a touch screen 51; and similarly, interactions between these elements will be further described hereinbelow.

Firstly, as shown in FIG. 5B, the electronic device 5 displays a home screen 510 on the touch screen 51. Similarly, the home screen 510 is a user interface which is at the lowest layer in the operating environment and comprises a row of system states. Next, the user inputs a first input 50 by means of the touch screen 51 and, according to the first input 50, the processing unit 53 has the electronic device 5 enter a home screen control mode (not shown) and automatically adjusts the home screen 510 from an initial display location 512 to a control display location 514 in the home screen control mode.

After the home screen 510 has been adjusted to the control display location 514, the user may input a second input 54 to the icon B via the touch screen 51 depending on his/her desired operations. In other words, the touch screen 51 can receive a second input 54 from the user after the home screen 510 has been automatically adjusted to the control display location 514. Thus, the processing unit 53 can execute a function corresponding to the icon B in response to the second input 54.

Figure 6:
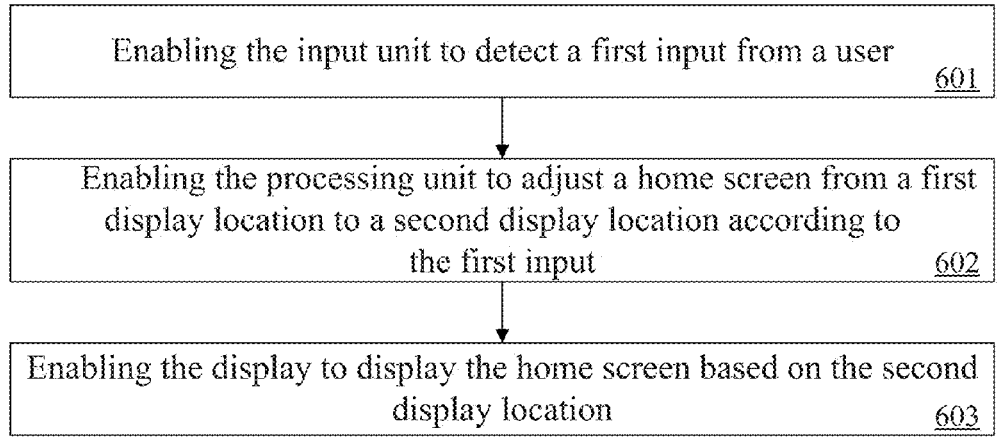
FIG. 6 is a flowchart diagram of a user interface operating method according to a sixth embodiment of the present invention.

A sixth embodiment of the present invention is a user interface operating method, a flowchart diagram of which is shown in FIG. 6B. The method of the sixth embodiment is for an electronic device (e.g. the electronic device 1 of the aforesaid embodiment) as well as an input unit, a processing unit and a display comprised therein (e.g., the input unit 11, the processing unit 13 and the display unit 15 of the aforesaid embodiment). Detailed steps of the sixth embodiment will be described hereinbelow.

Firstly, step 601 is executed to enable the input unit of the electronic device to detect a first input from a user. Next, step 602 is executed to enable the processing unit of the electronic device to adjust a home screen from a first display location to a second display location according to the first input. Similarly, the home screen is a user interface which is at the lowest layer in the operating environment and comprises a row of system states. Finally, step 603 is executed to enable the display of the electronic device to display the home screen based on the second display location so that the user can perform the subsequent operations.

Figure 7:
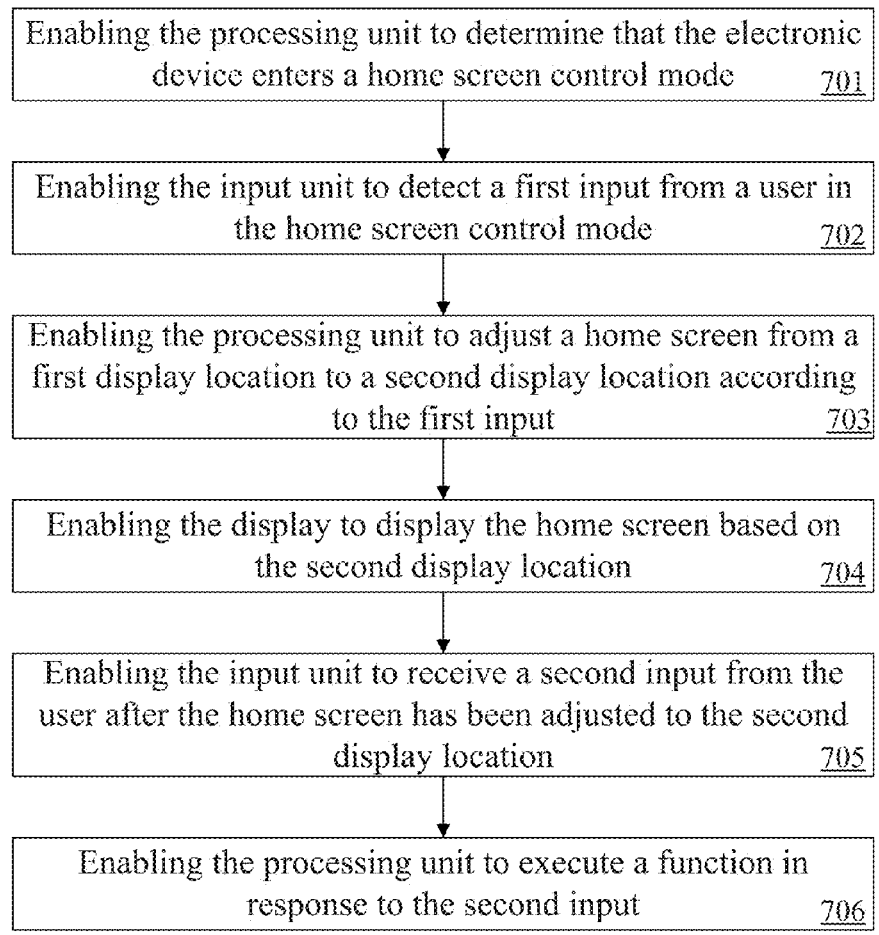
FIG. 7 is a flowchart diagram of a user interface operating method according to a seventh embodiment of the present invention.

A seventh embodiment of the present invention is a user interface operating method, a flowchart diagram of which is shown in FIG. 7B. The method of the seventh embodiment is for an electronic device (e.g. the electronic device 2 of the aforesaid embodiment) as well as an input unit, a processing unit and a display comprised therein (e.g., the input unit 21, the processing unit 23 and the display unit 25 of the aforesaid embodiment). Detailed steps of the seventh embodiment will be described hereinbelow.

Firstly, step 701 is executed to enable the processing unit of the electronic device to determine that the electronic device enters a home screen control mode. Step 702 is executed to enable the input unit of the electronic device to detect a first input from a user in the home screen control mode. Step 703 is executed to enable the processing unit of the electronic device to adjust a home screen from a first display location to a second display location according to the first input.

Step 704 is executed to enable the display of the electronic device to display the home screen based on the second display location. Step 705 is executed to enable the input unit of the electronic device to receive a second input from the user after the home screen has been adjusted to the second display location. Finally, step 706 is executed to enable the processing unit of the electronic device to execute a function in response to the second input.

Figure 8:
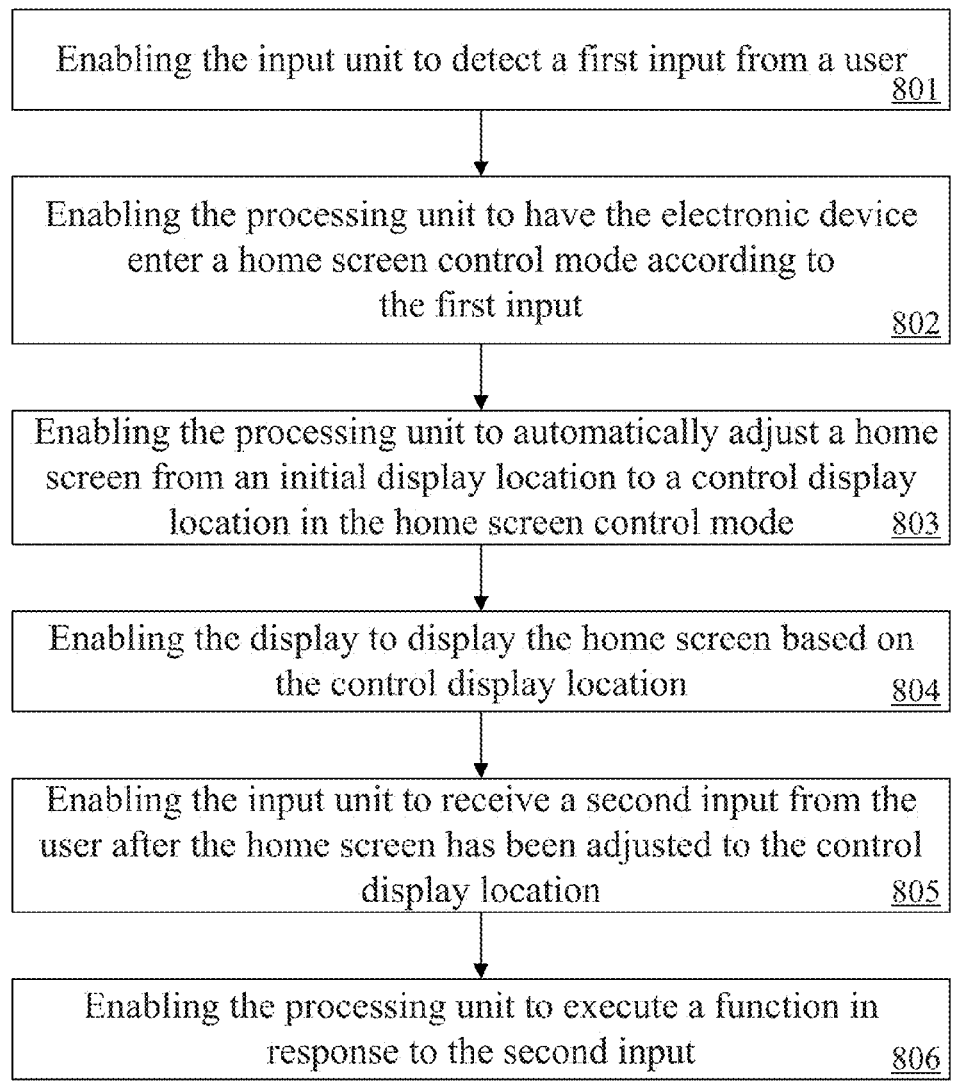
FIG. 8 is a flowchart diagram of a user interface operating method according to an eighth embodiment of the present invention.

An eighth embodiment of the present invention is a user interface operating method, a flowchart diagram of which is shown in FIG. 8B. The method of the eighth embodiment is for an electronic device (e.g. the electronic device 3 of the aforesaid embodiment) as well as an input unit, a processing unit and a display comprised therein (e.g., the input unit 31, the processing unit 33 and the display unit 35 of the aforesaid embodiment). Detailed steps of the eighth embodiment will be described hereinbelow.

Firstly, step 801 is executed to enable the input unit of the electronic device to detect a first input from a user. Step 802 is executed to enable the processing unit of the electronic device to have the electronic device enter a home screen control mode according to the first input. Next, step 803 is executed to enable the processing unit of the electronic device to automatically adjust a home screen from an initial display location to a control display location in the home screen control mode.

Then, step 804 is executed to enable the display of the electronic device to display the home screen based on the control display location. Step 805 is executed to enable the input unit of the electronic device to receive a second input from the user after the home screen has been adjusted to the control display location. Finally, step 806 is executed to enable the processing unit of the electronic device to execute a function in response to the second input.

Figure 9:
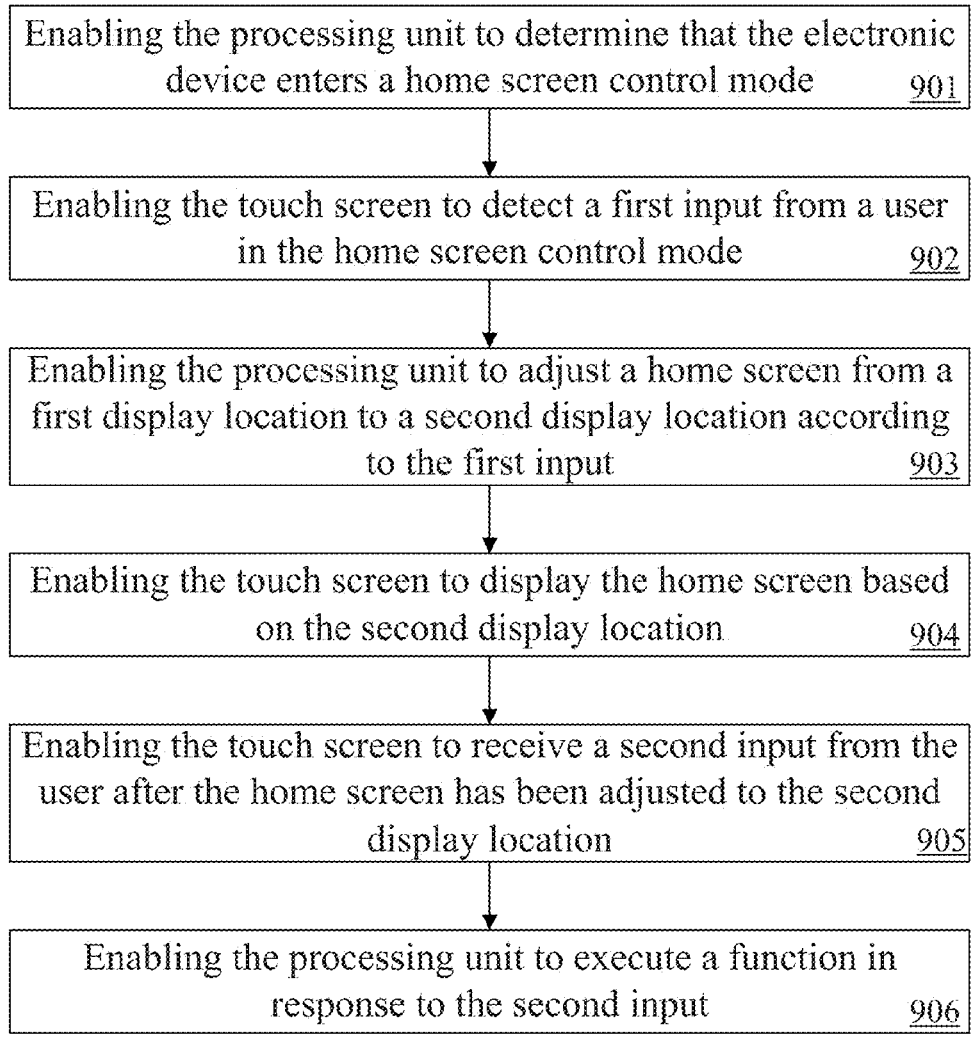
FIG. 9 is a flowchart diagram of a user interface operating method according to a ninth embodiment of the present invention.

A ninth embodiment of the present invention is a user interface operating method, a flowchart diagram of which is shown in FIG. 9B. The method of the ninth embodiment is for an electronic device (e.g. the electronic device 4 of the aforesaid embodiment) as well as a touch screen and a processing unit comprised therein (e.g. the touch screen 41 and the processing unit 43 of the aforesaid embodiment). Detailed steps of the ninth embodiment will be described hereinbelow.

Firstly, step 901 is executed to enable the processing unit of the electronic device to determine that the electronic device enters a home screen control mode. Step 902 is executed to enable the touch screen of the electronic device to detect a first input from a user in the home screen control mode. Step 903 is executed to enable the processing unit of the electronic device to adjust a home screen from a first display location to a second display location according to the first input.

Step 904 is executed to enable the touch screen of the electronic device to display the home screen based on the second display location. Step 905 is executed to enable the touch screen of the electronic device to receive a second input from the user after the home screen has been adjusted to the second display location. Finally, step 906 is executed to enable the processing unit of the electronic device to execute a function in response to the second input.

Figure 10:
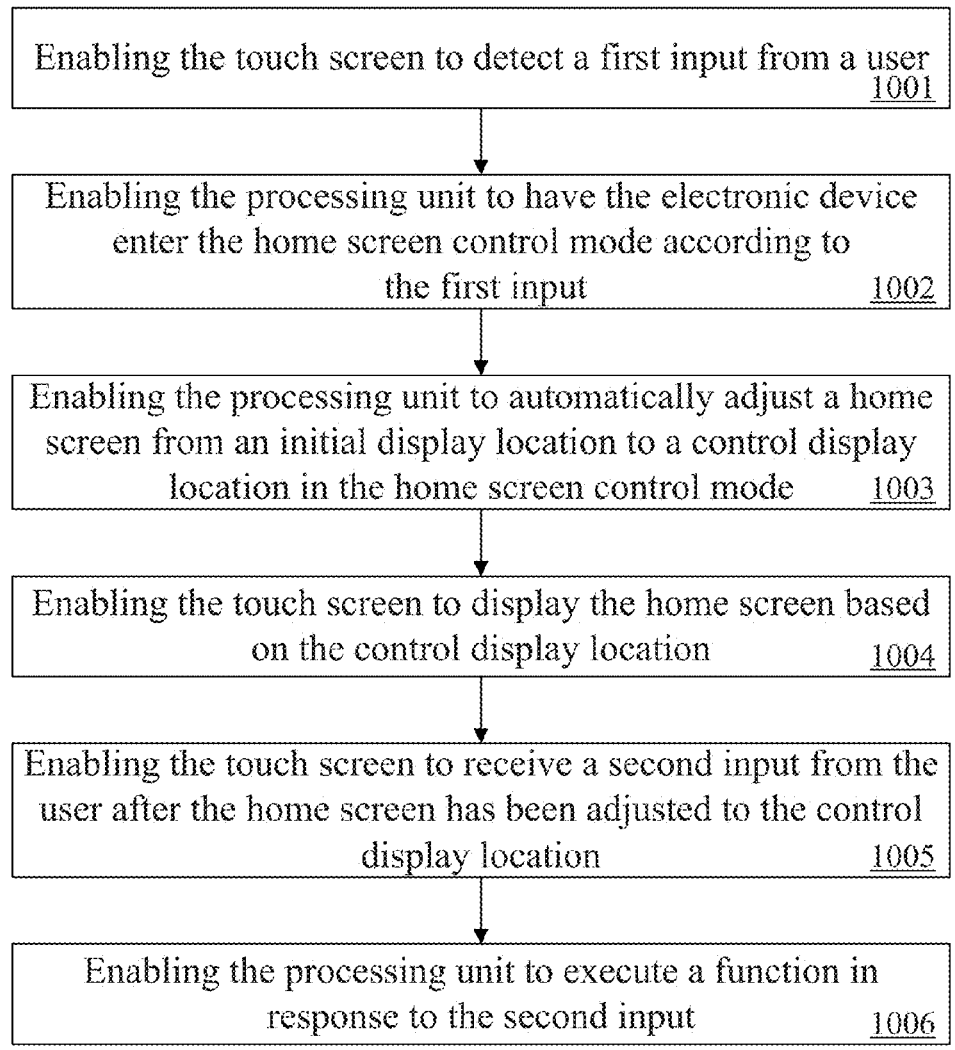
FIG. 10 is a flowchart diagram of a user interface operating method according to a tenth embodiment of the present invention.

A tenth embodiment of the present invention is a user interface operating method, a flowchart diagram of which is shown in FIG. 10B. The method of the tenth embodiment is for an electronic device (e.g. the electronic device 5 of the aforesaid embodiment) as well as a touch screen and a processing unit comprised therein (e.g. the touch screen 51 and the processing unit 53 of the aforesaid embodiment). Detailed steps of the tenth embodiment will be described hereinbelow.

Firstly, step 1001 is executed to enable the processing unit of the electronic device to determine that the electronic device enters a home screen control mode. Step 1002 is executed to enable the touch screen of the electronic device to detect a first input from a user in the home screen control mode. Step 1003 is executed to enable the processing unit of the electronic device to adjust a home screen from a first display location to a second display location according to the first input.

Step 1004 is executed to enable the touch screen of the electronic device to display the home screen based on the second display location. Step 1005 is executed to enable the touch screen of the electronic device to receive a second input from the user after the home screen has been adjusted to the second display location. Finally, step 1006 is executed to enable the processing unit of the electronic device to execute a function in response to the second input.

According to the above descriptions, the electronic device of the present invention and the user interface operating method thereof can directly adjust the home screen so that the user can accomplish corresponding operations more smoothly to increase the convenience in use of the electronic device.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

BRIEF DESCRIPTION OF REFERENCE NUMERALS

1, 2, 3, 4, 5 electronic device
10, 20, 30, 40, 50 first input 第一輸入
11, 21, 31 input unit
110, 210, 310, 410, 510 home screen
112, 212, 312 first display location
114, 214, 314 second display location
12, 22, 32 cursor
13, 23, 33, 43, 53 processing unit
14, 24, 34, 44, 54 second input
15, 25, 35 display
41, 51 touch screen
412, 512 initial display location
414, 514 control display location
A, B icon

The invention claimed is:

1. A user interface operating method for an electronic device, the electronic device comprising an input unit and a processing unit, the user interface operating method comprising:
   (a) enabling the input unit of the electronic device to detect a first input from a user; and
   (b) enabling the processing unit of the electronic device to move a whole home screen, and the same whole home screen is moved from a first display location to a second display location according to the first input, wherein an area of the whole home screen displayed on the second display location is smaller than an area of the whole home screen displayed on the first display location;
   wherein the whole home screen is a user interface which is at lowest layer in an operating environment, wherein the whole home screen is defined by a display area and visible contents thereof, and wherein the size and the visible contents of the display area of the first display location of the whole home screen are preserved in the move from the first display location to the second display location.

2. The user interface operating method as claimed in claim 1, wherein the electronic device further comprises a display, and the user interface operating method further comprises:
   (c) enabling the display of the electronic device to display the whole home screen based on the second display location.

3. The user interface operating method as claimed in claim 1, wherein the input unit is a touch screen, and the user interface operating method further comprises:
   (c) enabling the touch screen of the electronic device to display the whole home screen based on the second display location.

4. The user interface operating method as claimed in claim 1, further comprising:

(d) enabling the input unit of the electronic device to receive a second input from the user after the whole home screen has been moved to the second display location; and (e) enabling the processing unit of the electronic device to execute a function in response to the second input.

5. The user interface operating method as claimed in claim 1, further comprising the following step prior to the step (a):

(a1) enabling the processing unit of the electronic device to determine that the electronic device enters a home screen control mode;

wherein the input unit detects the first input from the user in the home screen control mode.

6. A user interface operating method for an electronic device, the electronic device comprising an input unit and a processing unit, the user interface operating method comprising:

(a) enabling the input unit of the electronic device to detect a first input from a user;

(b) enabling the processing unit of the electronic device to have the electronic device enter a home screen control mode according to the first input; and (c) enabling the processing unit of the electronic device to automatically move a whole home screen, and the same whole home screen is moved from an initial display location to a control display location in the home screen control mode wherein an area of the whole home screen displayed on the control display location is smaller than an area of the whole home screen displayed on initial display location on the whole home screen;

wherein the whole home screen is defined by a display area and visible contents thereof, and wherein the size and the visible contents of the display area of the initial display location of the whole home screen are preserved in the move from the initial display location to the control display location.

7. The user interface operating method as claimed in claim 6, wherein the electronic device further comprises a display, and the user interface operating method further comprises:

(d) enabling the display of the electronic device to display the whole home screen based on the control display location.

8. The user interface operating method as claimed in claim 6, wherein the input unit is a touch screen, and the user interface operating method further comprises:

(c) enabling the touch screen of the electronic device to display the whole home screen based on the control display location.

9. The user interface operating method as claimed in claim 6, further comprising:

(e) enabling the input unit of the electronic device to receive a second input from the user after the whole home screen has been moved to the control display location; and (f) enabling the processing unit of the electronic device to execute a function in response to the second input.

10. An electronic device, comprising:

an input unit having input circuitry and being operative to detect a first input from a user; and a processing unit having processing circuitry, electrically communicating with the input unit and being operative to move a whole home screen, and the same whole home screen is moved from a first display location to a second display location according to the first input, wherein an area of the whole home screen displayed on the second display location is smaller than an area of the whole home screen displayed on the first display location, and the whole home screen is a user interface which is at lowest layer in an operating environment;

wherein the whole home screen is defined by a display area and visible contents thereof, and wherein the size and the visible contents of the display area of the first display location of the whole home screen are preserved in the move from the first display location to the second display location.

11. The electronic device as claimed in claim 10, further comprising:

a display, being configured to display the whole home screen based on the second display location.

12. The electronic device as claimed in claim 10, wherein the input unit is a touch screen, and is further configured to display the whole home screen based on the second display location.

13. The electronic device as claimed in claim 10, wherein the input unit is further configured to receive a second input from the user after the whole home screen has been moved to the second display location, and the processing unit is further configured to execute a function in response to the second input.

14. The electronic device as claimed in claim 10, wherein the processing unit is further configured to determine that the electronic device enters a home screen control mode, and the input unit detects the first input from the user in the home screen control mode.

15. An electronic device, comprising:

an input unit having input circuitry and being operative to detect a first input from a user;

a processing unit having processing circuitry, electrically communicating with the input unit and being operative to have the electronic device enter a home screen control mode according to the first input, and to automatically move a whole home screen, and the same whole home screen is moved from an initial display location to a control display location in the home screen control mode, wherein an area of the whole home screen displayed on the control display location is smaller than an area of the whole home screen displayed on initial display location on the whole home screen, and the whole home screen is a user interface which is at lowest layer in an operating environment;

wherein the whole home screen is defined by a display area and visible contents thereof, and wherein the size and the visible contents of the display area of the initial display location of the whole home screen are preserved in the move from the initial display location to the control display location.

16. The electronic device as claimed in claim 15, further comprising:

a display, being configured to display the whole home screen based on the control display location.

17. The electronic device as claimed in claim 15, wherein the input unit is a touch screen configured to display the whole home screen based on the control display location.

18. The electronic device as claimed in claim 17, wherein the input unit is further configured to receive a second input from the user after the whole home screen has been moved to the control display location, and the processing unit is further configured to execute a function in response to the second input.

* * * * *